(12) United States Patent
Drange

(10) Patent No.: US 10,012,751 B2
(45) Date of Patent: Jul. 3, 2018

(54) ELECTRODE ADAPTER FOR GEOPHYSICAL SURVEYS

(71) Applicant: PGS Geophysical AS, Oslo (NO)

(72) Inventor: Geir Andre Motzfeldt Drange, Borgen (NO)

(73) Assignee: PGS Geophysical AS, Oslo (NO)

(*) Notice: Subject to any disclaimer, the term of this patent is extended or adjusted under 35 U.S.C. 154(b) by 633 days.

(21) Appl. No.: 14/561,315

(22) Filed: Dec. 5, 2014

(65) Prior Publication Data

US 2015/0369945 A1    Dec. 24, 2015

Related U.S. Application Data

(60) Provisional application No. 62/013,968, filed on Jun. 18, 2014.

(51) Int. Cl.
| | | |
|---|---|---|
| *G01V 3/12* | (2006.01) | |
| *G01V 3/165* | (2006.01) | |
| *G01V 1/20* | (2006.01) | |
| *G01V 3/36* | (2006.01) | |

(52) U.S. Cl.
CPC .............. *G01V 3/165* (2013.01); *G01V 1/201* (2013.01); *G01V 3/12* (2013.01); *G01V 3/36* (2013.01)

(58) Field of Classification Search
CPC . G01V 3/00; G01V 3/165; G01V 1/20; G01V 1/201; G01V 3/08; G01V 3/083; G01V 3/36; G01V 3/12
See application file for complete search history.

(56) References Cited

U.S. PATENT DOCUMENTS

| | | |
|---|---|---|
| 2,838,731 A | 6/1958 | Cruzan et al. |
| 3,182,250 A | 5/1965 | Mayes |
| 4,298,840 A | 11/1981 | Bischoff et al. |
| 6,674,286 B2 | 1/2004 | Lagmanson |
| 7,446,535 B1 | 11/2008 | Tenghamn et al. |
| 7,602,191 B2 | 10/2009 | Davidsson |
| 7,737,698 B2 | 6/2010 | Tenghamn et al. |
| 7,834,632 B2 | 11/2010 | Tenghamn et al. |

(Continued)

FOREIGN PATENT DOCUMENTS

| | | |
|---|---|---|
| CA | 2643545 | 6/2009 |
| EP | 2204673 | 7/2010 |
| GB | 2483159 | 2/2012 |

OTHER PUBLICATIONS

Extended European Search Report, Application No. 15172137.0, dated Mar. 29, 2016.

(Continued)

*Primary Examiner* — Son Le

(57) ABSTRACT

An apparatus. At least some illustrative embodiments are an apparatus comprising a sensor streamer. The sensor streamer includes at least one seismic streamer section and a first electrode adapter removably attached to the at least one seismic streamer section. The first electrode adapter includes a first electrode, wherein the first electrode is configured to couple to electrical circuitry configured to measure a potential difference between the first electrode at a first potential and a second potential. The conducting member forms a reference potential, wherein the conducting member is floating. The at least one seismic streamer section is without electromagnetic field-sensing components.

13 Claims, 6 Drawing Sheets

(56) References Cited

U.S. PATENT DOCUMENTS

| | | |
|---|---|---|
| 8,035,393 B2 | 10/2011 | Tenghamn et al. |
| 8,098,542 B2 | 1/2012 | Hillesund et al. |
| 8,198,899 B2 | 6/2012 | Lindqvist |
| 8,575,938 B2 | 11/2013 | Karlsen et al. |
| 8,587,316 B2 | 11/2013 | Juhasz et al. |
| 8,643,374 B2 | 2/2014 | Mackay |
| 8,669,766 B2 | 3/2014 | Lindqvist |
| 8,710,845 B2 | 4/2014 | Lindqvist et al. |
| 8,736,269 B2 | 5/2014 | Sudow et al. |
| 8,754,649 B2 | 6/2014 | Sudow et al. |
| 8,816,690 B2 | 8/2014 | Sudow et al. |
| 2006/0238200 A1* | 10/2006 | Johnstad ............... G01V 1/201 324/337 |
| 2009/0058422 A1 | 3/2009 | Tenghamn et al. |
| 2010/0001733 A1 | 1/2010 | Combee |
| 2011/0255368 A1 | 10/2011 | Sudow et al. |
| 2011/0260730 A1 | 10/2011 | Sudow et al. |
| 2011/0292759 A1 | 12/2011 | Sudow et al. |
| 2012/0081995 A1 | 4/2012 | Hillesund et al. |
| 2012/0242343 A1 | 9/2012 | Lindqvist |
| 2012/0314535 A1 | 12/2012 | Martinez |
| 2013/0119996 A1 | 5/2013 | Mackay et al. |
| 2013/0187655 A1 | 7/2013 | Juhasz et al. |
| 2013/0241559 A1 | 9/2013 | Lindqvist et al. |
| 2013/0300420 A1 | 11/2013 | Juhasz et al. |

OTHER PUBLICATIONS

Partial European Search Report, Application No. 15172137.0, dated Dec. 4, 2015.

* cited by examiner

ELECTRODE ADAPTER FOR GEOPHYSICAL SURVEYS

CROSS-REFERENCE TO RELATED APPLICATIONS

This application claims the benefit of U.S. Provisional Application Ser. No. 62/013,968 filed Jun. 18, 2014 and titled "Electrode Adapter for Electromagnetic (EM) and Combined EM Seismic Surveys". The provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., oceans, large lakes). Marine geophysical surveying systems frequently use a plurality of sensor streamers (long cables), which contain one or more sensors to detect energy emitted by one or more sources (e.g. seismic, electromagnetic) and subjected to interaction with underground formations below the water bottom. Electromagnetic streamers may include sensors for sensing electromagnetic fields indicative of hydrocarbon deposits beneath, for example a subterranean deposit beneath the sea floor. Seismic streamers may include sensors for detecting seismic signals reflected from the subterranean formations including the hydrocarbon deposit.

Sensor streamers such as those employed in marine geophysical surveying may be more than 10 kilometers in length. A plurality of such sensor streamers that are spaced apart may be towed in a body of water behind a survey vessel. A survey vessel may tow one or multiple sensor streamers which may comprise electromagnetic streamers alone or may include electromagnetic streamers in combination with seismic streamers.

BRIEF DESCRIPTION OF THE DRAWINGS

For a detailed description of exemplary embodiments, reference will now be made to the accompanying drawings in which.

DEFINITIONS

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Removably attached" shall mean that the attached components are designed to be coupled and de-coupled by hand, or with the use of tools, without cutting or otherwise damaging or destroying the components.

"Seismic streamer section" shall mean a sensor streamer section that includes sensors that are configured to detect acoustic signals or particle motion or both. As used herein, use of a seismic streamer section may or may not imply actuating such sensors or detecting such signals or motion.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

Figure 1:
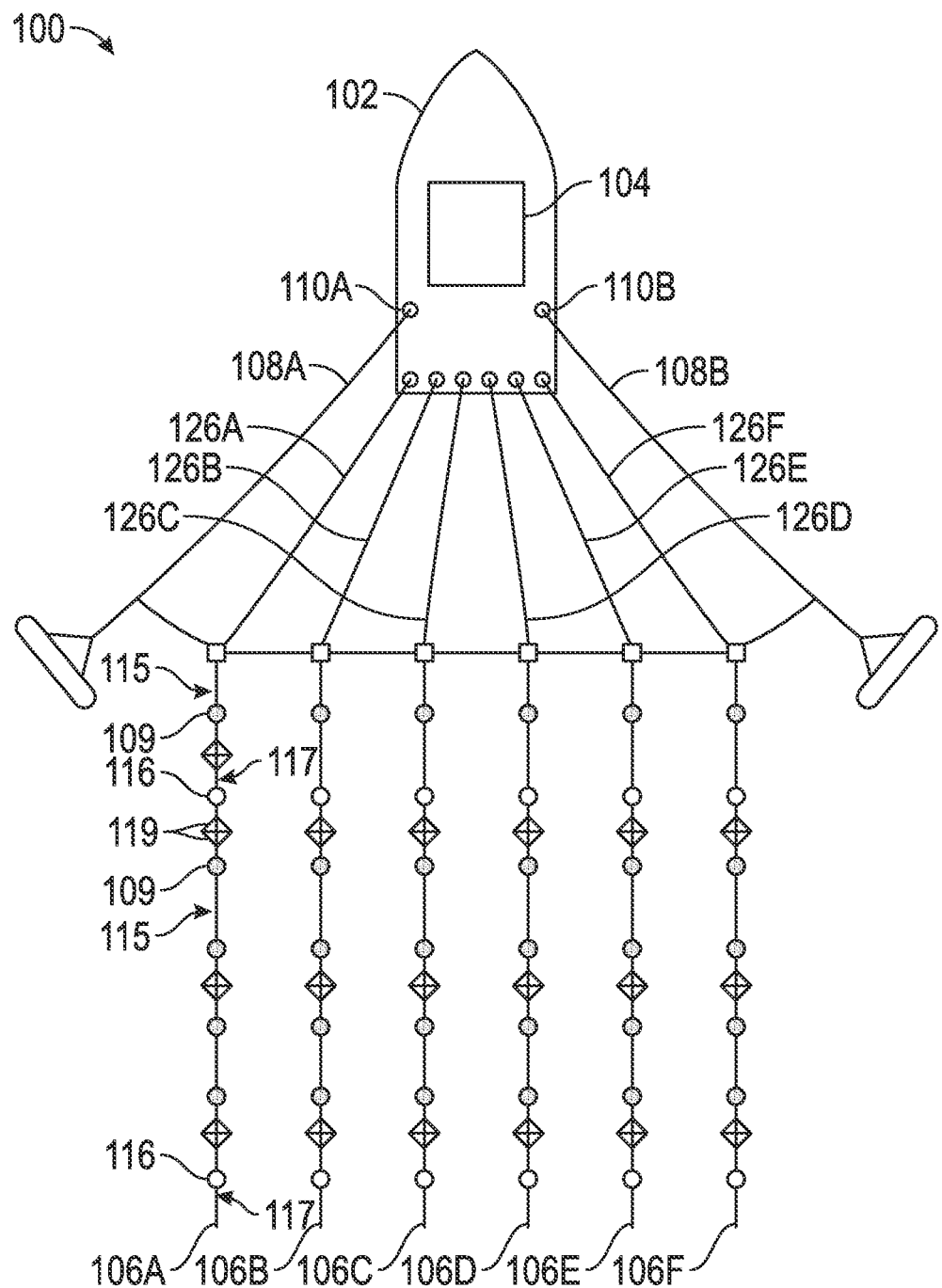
FIG. 1 shows an overhead view of a marine geophysical survey system in accordance with at least some embodiments.

FIG. 1 shows an overhead view of a marine geophysical survey system 100 in accordance with at least some embodiments. In particular, FIG. 1 shows a survey vessel 102 having onboard equipment, herein referred to collectively as onboard recording system 104, such as navigation, energy source control, and data recording and data processing equipment. Survey vessel 102 may be configured to tow one or more sensor streamers 106A-F through the water. While FIG. 1 illustratively shows six sensor streamers 106, any number of sensor streamers 106 may be used.

The sensor streamers 106 are coupled to towing equipment that maintains the sensor streamers 106 at selected depth and lateral positions with respect to each other and with respect to the survey vessel 102. The towing equipment may comprise two paravane tow lines 108A and 108B each coupled to the survey vessel 102 by way of winches 110A and 110B, respectively.

In other embodiments (not shown in FIG. 1) one or more sensor streamers 106 may be deployed on the sea floor as all or part of an ocean bottom cable. Sensor streamers 106 included within an ocean bottom cable may comprise one or more seismic streamer sections and one or more electrode adapters as described further below. A geophysical survey may include either towed sensor streamers as in the example shown in FIG. 1, ocean bottom cable, or both.

Electrical and/or optical connections between appropriate components in the onboard recording system 104, and components on the sensor streamers 106, such as electromagnetic sensors 116 may be made using inner lead-in cables 126A-F.

In a seismic survey, seismic sensors 109 may include one or more instruments such as hydrophones, geophones, or accelerometers to detect seismic signals. In an electromagnetic survey, electromagnetic sensors 116 may include an electric field detector, a magnetic field detector, or a combination electric field and magnetic field detector. In a geophysical survey, sensor streamers 106 may include seismic sensors, electromagnetic sensors, and combined seismic-electromagnetic sensors.

In some embodiments, a sensor streamer may be comprised of multiple seismic streamer sections 115 coupled together using connectors 119 disposed at each end of seismic streamer sections 115 that are conjoined with an another seismic streamer section 115. Seismic streamer sections 115 may comprise one or more seismic sensors 109, and may or may not have an electromagnetic field-sensing component or components. Connectors 119 may include one or more electrical and/or optical pins (not shown in FIG. 1) for relaying power and/or communications signals throughout the sensor streamer. A seismic streamer section may, in at least some embodiments, be in the range of 50 meters to 200 meters long. However, in other embodiments, seismic streamer sections having various lengths may be used.

Further, electrode adapters 117 may be disposed on or within sensor streamers 106. Electrode adapters 117 also may be coupled to seismic streamer sections 115 via connectors 119. As described further in conjunction with FIG. 3, electrode adapters 117 may comprise an electromagnetic sensor 116 including an electrode (not shown in FIG. 1) for electrically communicating with a water body through which the electromagnetic signals travel, as described further below in conjunction with FIG. 2. Each electromagnetic sensor 116 may be associated with an electrode adapter 117, or one or more electromagnetic sensors 116 may not be associated with an electrode adapter 117. Electrode adapters 117 may have a length less than 5 meters, and in at least some embodiments may have a length in the range of 0.5 to 1 meters. Seismic streamer sections 115 may be interposed between electrode adapters 117 to provide a spaced-apart relationship between the respective electrodes thereof. In at least some embodiments, the distance between electrode adapters 117 may be greater than or equal to about 100 meters or up to several hundred meters or more. Further, electrode adapters 117 may be removably attached to seismic streamer sections 115.

Seismic sensors 109 and electromagnetic sensors 116 may be connected via a communication pathway to onboard recording system 104 along a length of a sensor streamer 106, which may, in some embodiments reach lengths of tens of kilometers.

Figure 2:
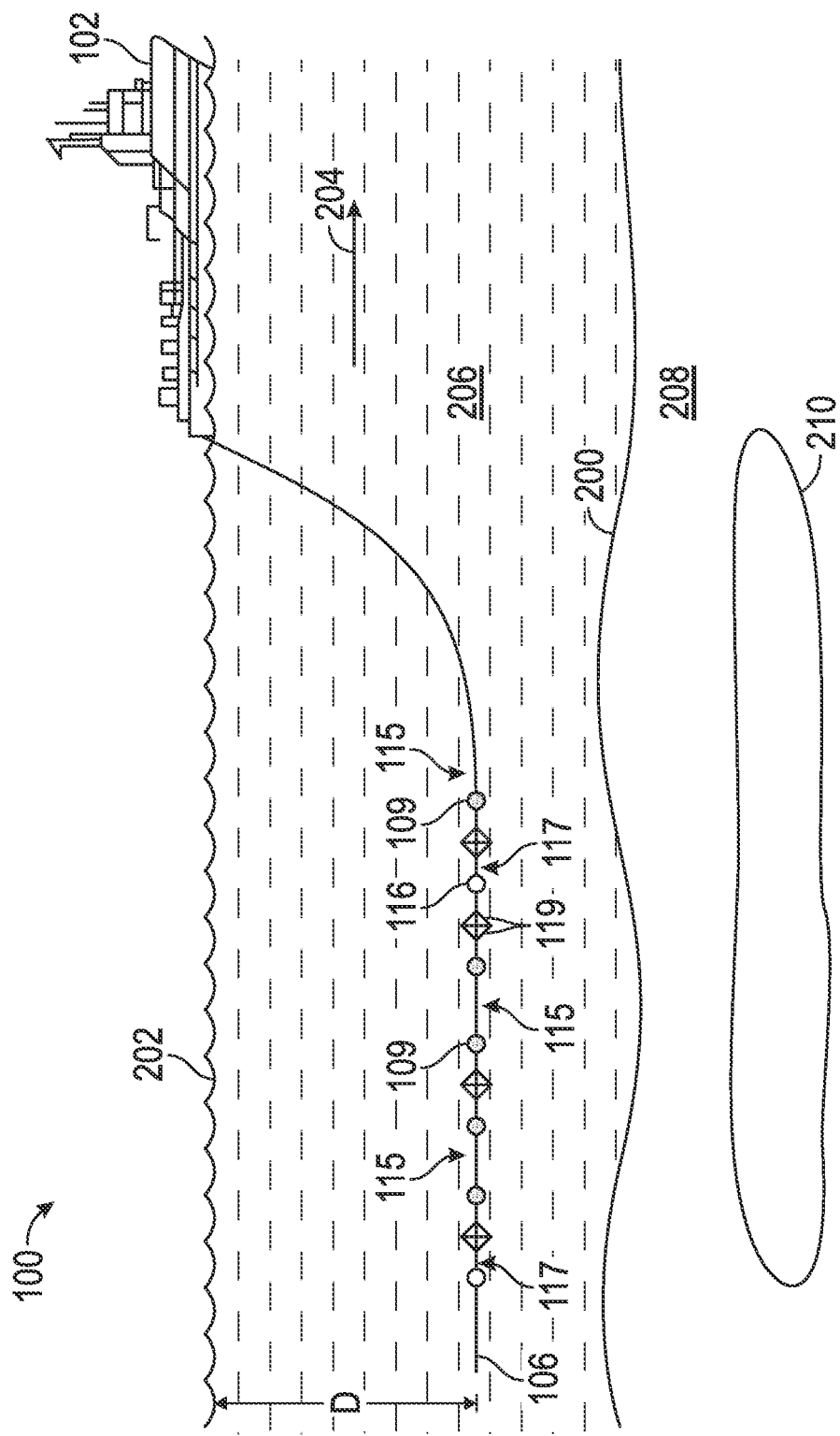
FIG. 2 shows a side elevation view of a marine geophysical survey in accordance with at least some embodiments.

Refer now to FIG. 2 showing a side view of marine geophysical survey system 100 in order to convey further concepts. In particular, FIG. 2 shows the survey vessel 102 towing sensor streamer 106 along a path of travel 204 within water body 206, which may be comprised of sea water. In FIG. 2, for ease of illustration, only a single sensor streamer 106 is shown. However as described in conjunction with FIG. 1, a marine geophysical survey system 100 may include any number of sensor streamers. Sensor streamer 106 may be towed above the seabed 200 at a depth, D, beneath the surface (which may vary along a length of sensor streamer 106 and from one sensor streamer 106 to another). In this way, the electrodes of an electromagnetic sensor 116 may be immersed in the water body and in electrical contact therewith.

Electromagnetic signals from an electromagnetic source (not shown in FIG. 2) travel through water body 206 to sea bed 200 and into formation 208 beneath sea bed 200. Formation 208 reacts back on the electromagnetic field in accordance with the electrical properties of the formation. In particular, the electrical resistivity of a hydrocarbon reservoir 210 in formation 208 may be higher (i.e. electrical conductivity lower) than a permeable aqueous saline bearing material comprising formation 208 and disposed about hydrocarbon reservoir 210. The energy reflected from the hydrocarbon reservoir 210 may travel back through water body 206 and may be coupled via the electrodes of electromagnetic sensor 116 to circuitry for measuring the electromagnetic fields, as will now be described in conjunction with FIGS. 3-5.

Figure 3:
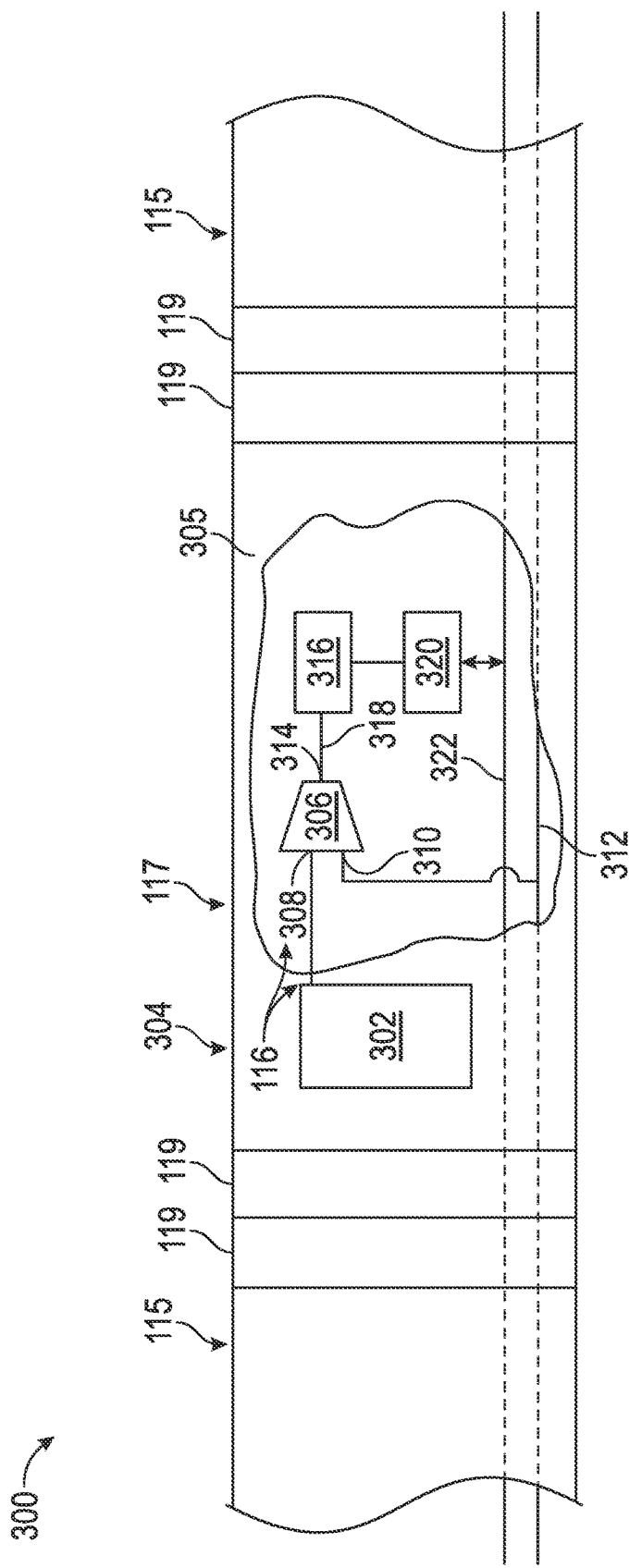
FIG. 3 shows a partial cutaway view of a portion of a sensor streamer in accordance with at least some embodiments.

FIG. 3 shows a portion 300 of a sensor streamer 106 in accordance with at least some embodiments. Portion 300 may include two seismic streamer sections 115 and an electrode adapter 117 interposed therebetween. Seismic streamer sections 115 and electrode adapter 117 may be coupled via one or more connectors 119. In accordance with at least some embodiments, electrode adapter 117 includes an electromagnetic sensor 116 including an electrode 302 which may be comprised of an electrically conducting material. For example, electrode 302 may be comprised of graphite, or a metal such as steel, titanium, aluminum, copper, gold or silver, or alloys thereof. Electrode 302 may be disposed within or upon electrode adapter 117 such that, when the sensor streamer 106 including an electrode adapter 117 is deployed in a geophysical survey, electrode 302 is exposed to and in electrical contact with the seawater comprising the water body through which the sensor streamer is towed. For example, electrode 302 may be disposed on an outer surface 304 of an optional outer jacket 305 of electrode adapter 117. In at least some embodiments, a surface of electrode 302 may be treated to enhance the conductivity to seawater. In at least some other embodiments, electrode 302 may be disposed within a cavity in electrode adapter 117 or within a conductive-gel-filled pocket in electrode adapter 117.

Electrode 302 may be configured to couple to electrical circuitry that is measures a potential difference between electrode 302, which may be at a first potential, and a second potential. Such electrical circuitry may, in some embodiments, be disposed outside of electrode adapter 117, for example in a seismic streamer section. In at least some other embodiments, the electrical circuitry may be disposed within an electrode adapter 117, as shown in FIG. 3. For example, electromagnetic sensor 116 may also include digitizing circuitry or devices, such as an analog-to-digital converter (ADC or "digitizer") 306. Electrode 302 may be connected to an input terminal 308 of ADC 306 which may comprise first electrical circuitry that that senses the first potential. A second input terminal, input terminal 310, of ADC 306 may be connected to another electrode 302 (not shown), another electromagnetic sensor 116 (not shown), another electrode adapter 117 (not shown), or an electrically floating conducting member such as reference wire 312, for example. Input terminal 308 may comprise a second electrical circuitry that senses the second potential. Electrode 302 may be coupled to input terminal 308 of ADC 306 disposed within an interior volume 323 of electrode adapter 117 by an electrical feed through bulkhead connector (not shown in FIG. 3) passing through optional outer jacket 305, or electrode 302 may otherwise be in data communication with input terminal 308 of ADC 306 (e.g. radiofrequency, near-field communication, Bluetooth low-energy etc.). In operation in the course of a geophysical survey, ADC 306 may digitize the potential difference appearing between input terminal 308 and input terminal 310, e.g. the potential difference between electrode 302, the other electrode 302 (not shown), the other electromagnetic sensor 116 (not shown), the other electrode adapter 117 (not shown), or the reference wire 312. The potential difference may be indicative of the electromagnetic field in the water body proximal the electrode adapter 117. In some cases, the electrode adapter has only one ADC 306 given the relatively short nature of the electrode adapter (e.g., two meters or less).

Figure 4:
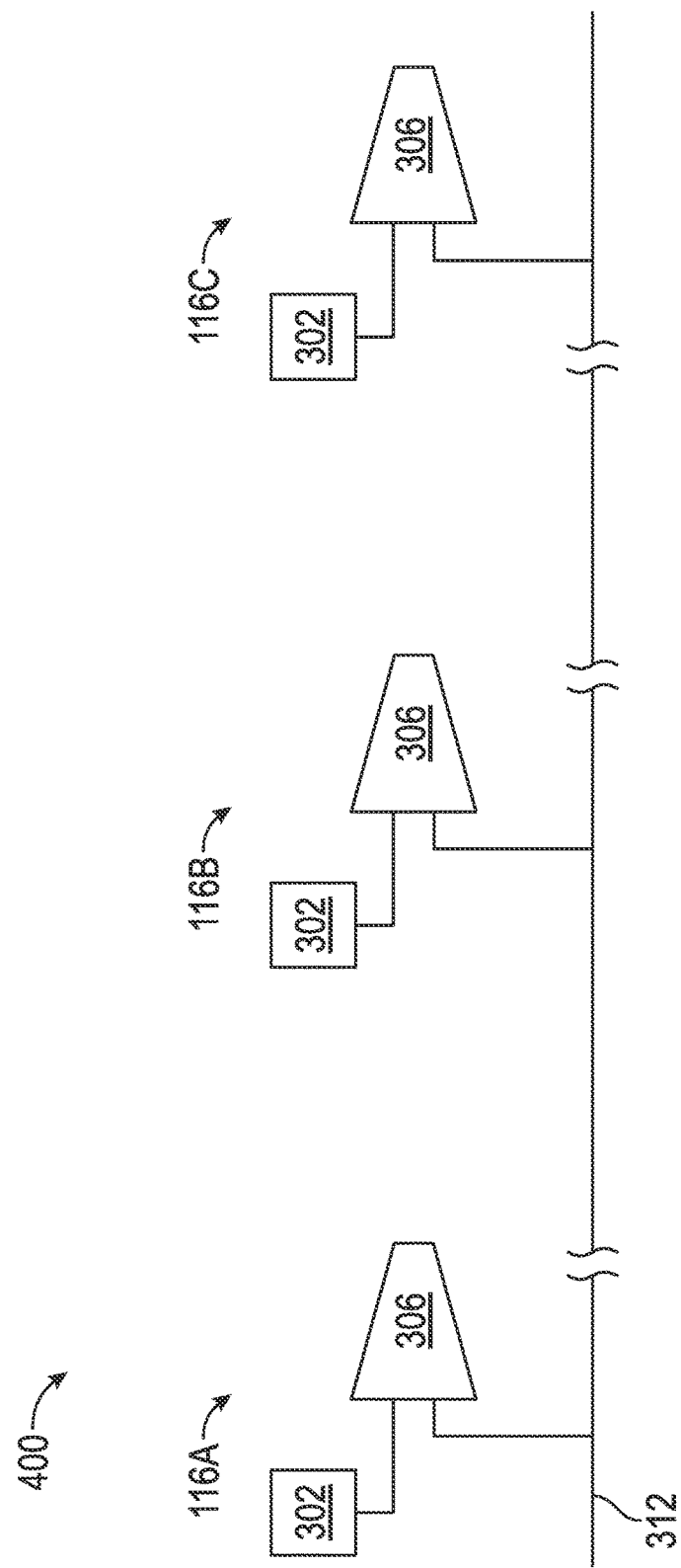
FIG. 4 schematically shows a portion a sensor streamer accordance with at least some embodiments.

FIG. 4, illustrates, in simplified form, a portion 400 of a sensor streamer 106 comprising a plurality of electromagnetic sensors 116A-C. Each of electromagnetic sensors 116A-C may comprise an electrode 302 and an ADC 306. Further, each of electromagnetic sensors 116A-C may be part of a respective electrode adapter 117, not shown in FIG. 4 for ease of illustration. Electromagnetic sensor 116C may, for example, be disposed at or near the proximal end (i.e. the end nearest the survey vessel 102) of the sensor streamer and electromagnetic sensor 116A may be disposed at or near the distal end (i.e. the end furthest from the survey vessel 102) of the sensor streamer. Thus, electromagnetic sensors 116A and 116C may be spaced apart a distance of about 10 km, for example. Electromagnetic sensor 116B may be disposed at an intermediate distance between electromagnetic sensors 116A and 116C. Portion 400 depicts the commonality of reference wire 312 between the electromagnetic sensors. Reference wire 312 may span a length of the sensor streamer. In at least some embodiments, reference wire 312 may electrically float. Stated differently, reference wire 312 may not be connected to any other electrical conductor, but may only be electrically connected to an input terminal of one or more ADCs 306. In at least some other embodiments, reference wire 312 may be connected to the water body at the distal end of a sensor streamer 106. In other words, in at least some embodiments, reference wire 312 may have a single point of contact with the water body. Each of electromagnetic sensors 116A-C may measure a potential difference between their respective electrodes 302 and reference wire 312, thereby obtaining a measure indicative of the electromagnetic field in the water body in the proximal the respective electromagnetic sensor.

Returning to FIG. 3, the digitized potential difference measurement at output terminal 314 of ADC 306 may be coupled to a processor, such as microcontroller (MCU) 316, which acquires the potential difference data. Any suitable processor may be used as MCU 316. ADC 306 and MCU 316 may be connected by any suitable bus 318. For example bus 318 may comprise a serial peripheral bus, such as an $I^2C$ bus. MCU 316 may then communicate the potential difference data to the onboard recording system 104. MCU 316 may communicate the data via the streamer telemetry system using telemetry and power unit 320. Telemetry and power unit 320 may comprise an optical telemetry unit in at least some embodiments and an electrical telemetry unit in at least some other embodiments. MCU 316 and telemetry and power unit 320 may be connected by any suitable bus, such as an $I^2C$ bus for example. Telemetry and power unit 320 may communicate with onboard recording system 104 via wire bundle 322. Wire bundle 322 may comprise one or more telemetry channels and primary power lines for the sensor streamer. Wire bundle 322 may comprise electrical wire, optical fiber, or any combination thereof. Telemetry and power unit 320 may include power conditioning circuitry to transform the sensor streamer primary power levels to voltages and/or currents appropriate for the devices comprising MCU 316 or other processor and ADC 306, as well as circuitry within telemetry and power unit 320 itself. Alternatively, MCU 316 may communicate directly with onboard recording system 104. For example, although not shown in FIG. 3, wire bundle 322 may include one or more buses for directly communicating with onboard recording system 104, such as an Ethernet bus, which may be used, for example, with an MCU 316 including an Ethernet controller and physical layer. In some embodiments, the components of electrode adapter 117 may be powered down independently of the other components of the sensor streamer 106 (and vice versa).

Although in the exemplary embodiment of an electrode adapter 117 of FIG. 3, the components comprising electromagnetic sensor 116 are disposed within electrode adapter 117, in alternative cases one or more of the components may be disposed in, for example, a seismic streamer section. Stated otherwise, an electromagnetic sensor 116 may use devices deployed within a seismic streamer section 115 connected to the electrode adapter 117. Thus, for example, the ADC 306 may be deployed within the electrode adapter 117 and connected via a peripheral bus to a "spare" MCU deployed in a connected seismic streamer section 115; the peripheral bus in the electrode adapter 117 connected to a corresponding peripheral bus in the seismic streamer section 115 through a connector 119 including the appropriate electrical and mechanical architecture to interconnect the two peripheral bus segments in the electrode adapter and seismic streamer section.

Figure 5:
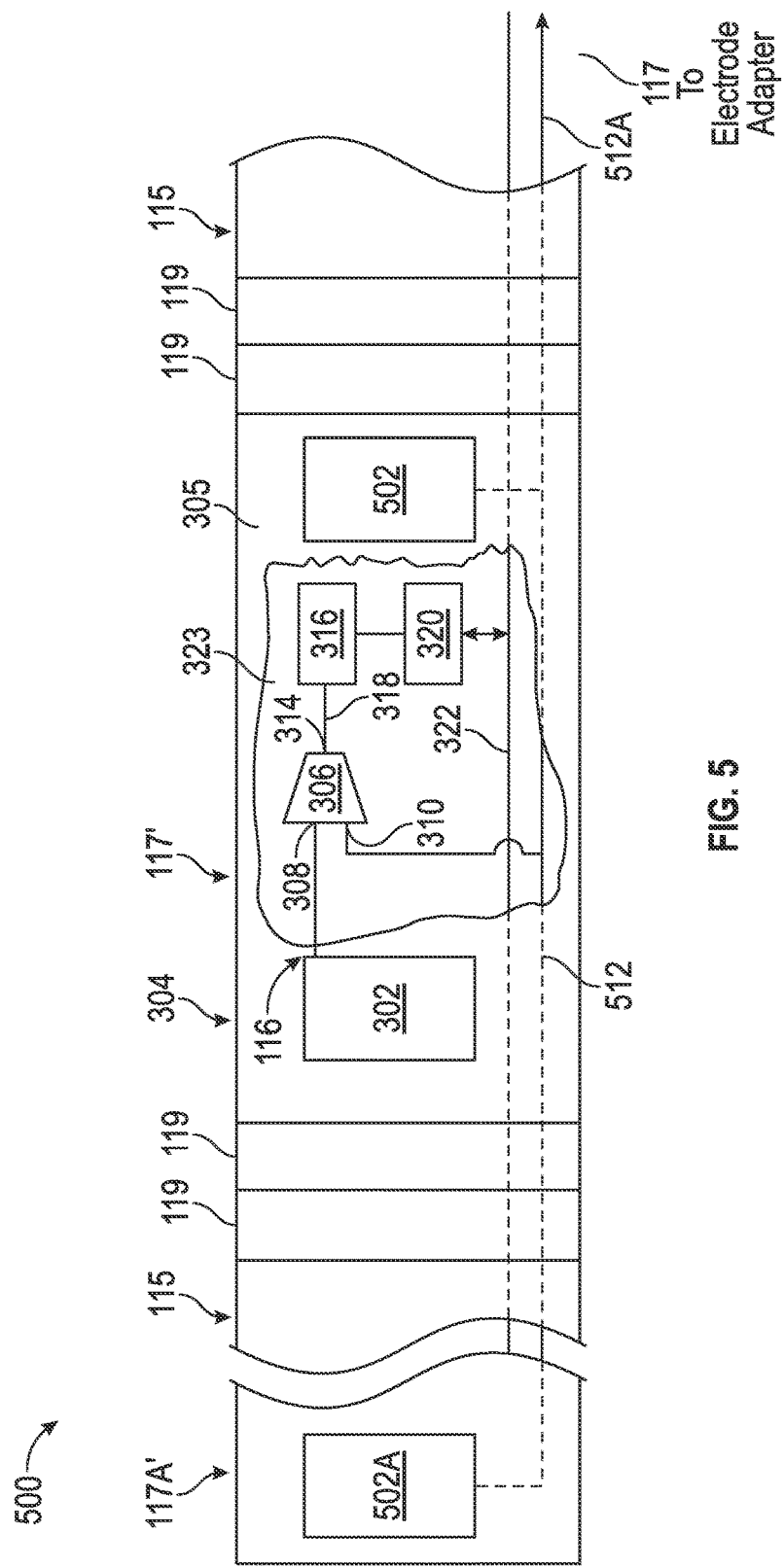
FIG. 5 shows a partial cutaway view of a portion of a sensor streamer in accordance with at least some alternative embodiments.

Referring now to FIG. 5, there is shown therein a portion 500 of a sensor streamer in accordance with another embodiment. Electrode adapter 117' includes a second electrode 502. Similar to electrode 302, electrode 502 may be disposed on or within electrode adapter 117', as described in conjunction with FIG. 3. Likewise, electrode adapter 117A' includes an electrode 502A. Electrode adapter 117A' may be in a spaced-apart relationship with electrode adapter 117' with one or more seismic streamer sections 115 interposed therebetween. For example, electrode adapters 117' and 117A' may be spaced apart a distance in the range of 100 meters to 5000 meters. Electrode 502A may be connected to input terminal 310 of ADC 306 via electrode wire 512. Likewise, electrode 502 at electrode adapter 117' may be connected to a second electrode wire 512A and then, via wire 512A, to an input terminal of an ADC or other digitizing circuitry in a third electrode adapter 117'', which may also include an electrode similar to electrode 302 coupled to a second input terminal of the ADC in electrode adapter 117'' (not shown in FIG. 5). ADC 306 in electrode adapter 117' may thus measure the potential difference between electrode 302 and electrode 502A. In this way, electromagnetic sensor 116 may thereby obtain a measurement indicative of the electromagnetic field in the water body in the proximate to the electrode adapters 117A' and 117'.

Figure 6:
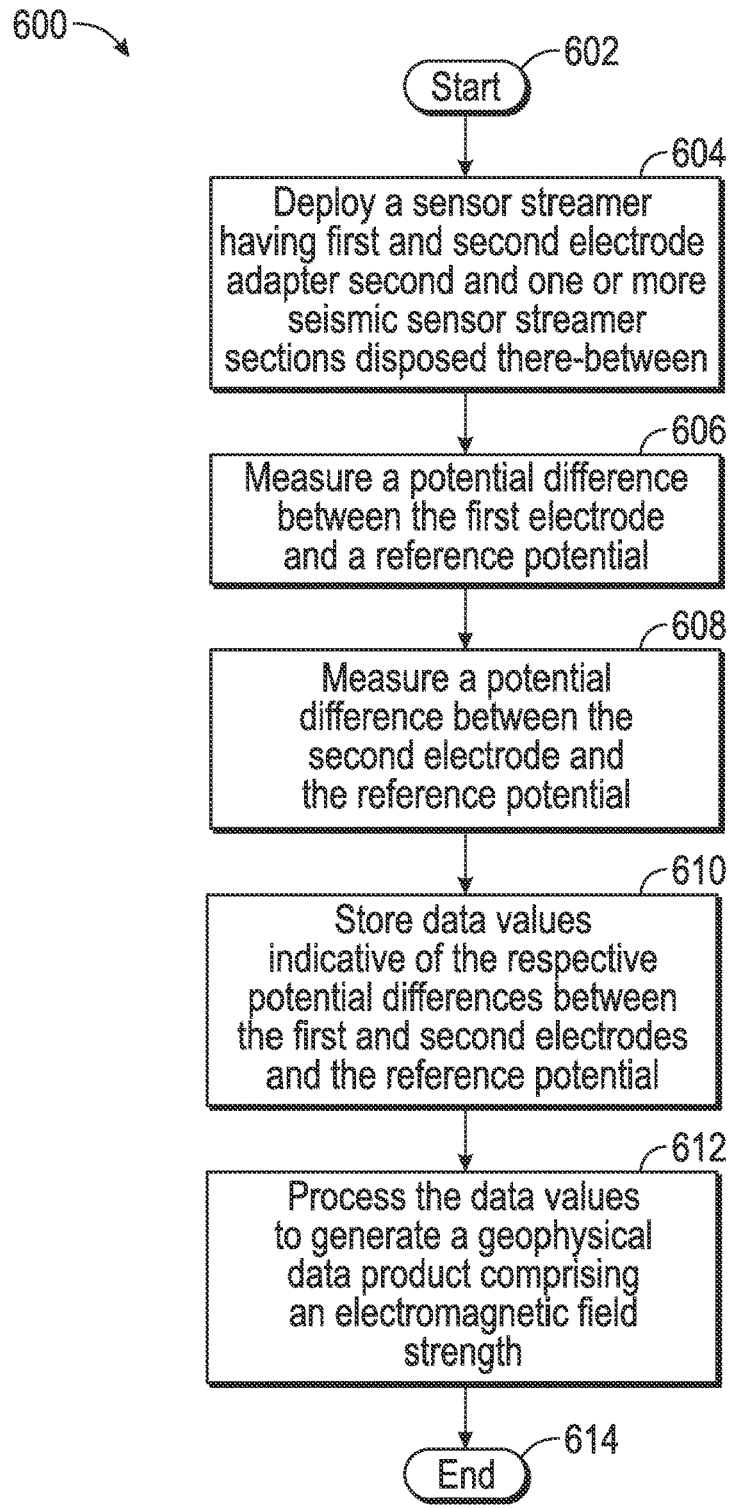
FIG. 6 shows a flowchart of a method in accordance with at least some embodiments.

Refer now to FIG. 6 showing a flow chart of a geophysical survey method 600 according to at least some embodiments. Method 600 starts at block 602. In block 604, a sensor streamer having an electrode adapter and one or more seismic streamer sections coupled to the electrode adapter is deployed. At least one of an electromagnetic potential proximal the electrode adapter, a pressure proximal the seismic streamer section and a particle velocity proximal the seismic sensor streamer is measured, block 606. The potential difference may be indicative of an electromagnetic field proximal the first electrode adapter. The electrode adapter may comprise an electrode coupled to a first input terminal of circuitry disposed in the electrode adapter and a reference conductor coupled to a second input terminal of the circuitry wherein a potential difference between the electrode and reference conductor is indicative of the electromagnetic potential proximal the electrode adapter. The circuitry may include an analog-to-digital convertor and circuitry to communicate a data value indicative of the electromagnetic potential proximal the electrode adapter to a data recording system as previously described. Process 600 ends at block 614.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor streamer 106 may comprise multiple individual sections electrically and mechanically coupled end-to-end to form each overall sensor streamer 106. It is intended that the following claims be interpreted to embrace all such variations and modifications.

What is claimed is:

1. An apparatus comprising:
   a first electrode adapter comprising a first electrode, and the first electrode adapter configured to couple to a seismic streamer section;
   a second electrode adapter disposed in a spaced-apart relationship with the first electrode adapter, the second electrode adapter comprising a second electrode;
   a third electrode adapter disposed in a spaced apart relationship with the first electrode adapter, the third electrode adapter comprising a third electrode coupled to a second input terminal of a first digitizer; and
   the third electrode adapter comprises a fourth electrode, the fourth electrode coupled to an input terminal of a second digitizer;
   wherein the first and second electrode adapters are configured to measure a potential difference between the first electrode and the second electrode.

2. An apparatus comprising:
   a first electrode adapter, the first electrode adapter comprising:
      a first connector on a first end of the first electrode adapter;
      a second connector on a second end of the first electrode adapter opposite the first end;
      an outer jacket coupled between the first and second connectors, the outer jacket defines an internal volume;
      a length measured from the first connector to the second connectors along the outer jacket, the length less than 2 meters;
      only one electrode associated with the outer jacket;
      only one analog-to-digital converter (ADC) disposed within the outer jacket, the ADC having a first input terminal coupled to the electrode;
      a conducting member disposed within the outer jacket, the conducting member connected to a second input terminal of the ADC, the conducting member comprising a reference potential; and
      the ADC configured to measure a potential difference between the first electrode and the conducting member, the potential difference between the first electrode and the conducting member indicative of an electromagnetic signal proximal the first electrode adapter;
   wherein the first connector is configured to removably attach to a seismic streamer section, and the first electrode adapter is devoid of sensors that detect seismic energy.

3. The apparatus of claim 2 wherein the length is between and including 0.5 and 1 meters.

4. The apparatus of claim 2 wherein the first electrode adapter further comprises:
   a processor disposed within the outer jacket, the processor distinct from the ADC, and the processor coupled to an output terminal of the ADC, wherein the processor configured to acquire a data value indicative of the electromagnetic signal from the ADC.

5. The apparatus of claim 4 wherein the first electrode adapter further comprises:
   a telemetry unit disposed within the outer jacket, the telemetry unit distinct from the processor and the ADC, the telemetry unit coupled to an output terminal of the processor;
   the telemetry unit is configured to receive the data value indicative of the electromagnetic signal, and configured to couple the data value indicative of the electromagnetic signal to a communication link coupled to a survey vessel via the first connector.

6. The apparatus of claim 2 further comprising:
   a seismic streamer section coupled to the first electrode adapter by way of the first connector, the seismic streamer section does not have an electromagnetic field-sensing component;
   a second electrode adapter comprising:
      a third connector on a first end of the second electrode adapter;
      a fourth connector on a second end of the second electrode adapter;
      an outer jacket coupled between the third and fourth connectors, the outer jacket of the second electrode adapter defines an internal volume;
      a length measured from the third connector to the fourth connector along the outer jacket of the second electrode adapter, the length measured from the third to fourth connector less than 2 meters;
      the second electrode adapter coupled to the seismic streamer section by way of the third connector;
      only one electrode associated with the outer jacket of the second electrode adapter, the electrode disposed between the third and fourth connectors;
      only one ADC disposed within the outer jacket of the second electrode adapter, the ADC of the second electrode adapter having a first input terminal coupled to the electrode of the second electrode adapter and a second input terminal coupled to the conducting member;
      the ADC of the second electrode adapter is configured to measure a potential difference between the electrode of the second electrode adapter and the conducting member, the potential difference between the electrode of the second electrode adapter and the conducting member indicative of an electromagnetic signal proximal the second electrode adapter;

wherein the second electrode adapter is devoid of sensors that detect seismic energy.

7. The apparatus of claim 2 further comprising:
a seismic streamer section coupled to the first electrode adapter by way of the first connector, the seismic streamer section devoid of electrodes configured to sense voltages associated with electromagnetic fields; and
a processor disposed within the seismic streamer section, the ADC coupled to the processor, and the processing configured to acquire a data value indicative of the electromagnetic signal from the ADS disposed in the electrode adapter.

8. An apparatus comprising:
a first electrode adapter comprising:
   a first connector on a first end of the first electrode adapter;
   a second connector on a second end of the first electrode adapter opposite the first end;
   a first outer jacket coupled between the first and second connectors, the first outer jacket defines an internal volume;
   a first electrode associated with the first outer jacket between the first and second conductors;
   only one analog-to-digital converter (ADC) disposed within the first outer jacket, the ADC having a first input terminal coupled to the first electrode;
   a first conducting member disposed within the first outer jacket, the first conducting member connected to a second input terminal of the ADC, the first conducting member comprising a reference potential;
   the ADC configured to measure a potential difference between the first electrode and the conducting member, the potential difference between the first electrode and the conducting member indicative of an electromagnetic signal proximal the first electrode adapter;
   a second electrode associated with the first outer jacket between the first and second connectors; and
   a second conducting member disposed within the first outer jacket and coupled to the second conductor, the second conducting member and second electrode electrically isolated from the first electrode within the first electrode adapter;
   wherein the first connector is configured to removably attach to a seismic streamer section, and the first electrode adapter is devoid of sensors that detect seismic energy.

9. The apparatus of claim 8 a length measured from the first connector to the second connectors along the first outer jacket, the length less than 2 meters.

10. The apparatus of claim 8 wherein the length is between and including 0.5 and 1 meters.

11. The apparatus of claim 8 further comprising:
a seismic streamer section coupled to the first electrode adapter by way of the first connector, the seismic streamer section devoid of electrodes configured to sense voltages associated with electromagnetic fields;
a second electrode adapter comprising:
   a third connector on a first end of the second electrode adapter;
   a fourth connector on a second end of the second electrode adapter;
   a second outer jacket coupled between the third and fourth connectors, the second outer jacket defines an internal volume;
   the second electrode adapter coupled to the seismic streamer section by way of the third connector;
   a third electrode associated with the second outer jacket between the third and fourth conductors;
   only one analog-to-digital converter (ADC) disposed within the second outer jacket, the ADC of the second electrode adapter having a first input terminal coupled to the second electrode;
   a third conducting member disposed within the second outer jacket, the third conducting member connected to a second input terminal of the ADC of the second electrode adapter, the third conducting member comprising a reference potential;
   the ADC of the second electrode adapter configured to measure a potential difference between the third electrode and the third conducting member, the potential difference between the third electrode and the third conducting member indicative of an electromagnetic signal proximal the second electrode adapter; and
   a fourth electrode associated with the second outer jacket between the third and fourth connectors, the fourth electrode coupled to the second conducting member;
   wherein the first second electrode adapter is devoid of sensors that detect seismic energy.

12. The apparatus of claim 11 further comprising:
a first length measured from the first connector to second fourth connector along the first outer jacket, the first length less than 2 meters; and
a second length measured from the third connector to the fourth connector along the second outer jacket, the first length less than 2 meters.

13. The apparatus of claim 8 further comprising:
a seismic streamer section coupled to the first electrode adapter by way of the first connector, the seismic streamer section devoid of electrodes configured to sense voltages associated with electromagnetic fields;
a processor disposed within the seismic streamer section, the ADC coupled to the processor, and the processing configured to acquire a data value indicative of the electromagnetic signal from the ADS disposed in the electrode adapter.

* * * * *